US012496952B2

United States Patent
Hrecznyj et al.

(10) Patent No.: US 12,496,952 B2
(45) Date of Patent: Dec. 16, 2025

(54) THERMAL ENCLOSURE ASSEMBLY FOR A VEHICLE

(71) Applicant: Ford Global Technologies, LLC, Dearborn, MI (US)

(72) Inventors: Michael Hrecznyj, Livonia, MI (US); Michael M. Azzouz, Farmington, MI (US); Scott Nydam, Farmington Hills, MI (US); Marcos Silva Kondrad, Macomb Township, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 18/073,795

(22) Filed: Dec. 2, 2022

(65) Prior Publication Data

US 2024/0181948 A1    Jun. 6, 2024

(51) Int. Cl.
*B60N 3/10* (2006.01)
*B60H 1/00* (2006.01)
*B60N 3/00* (2006.01)

(52) U.S. Cl.
CPC ......... *B60N 3/104* (2013.01); *B60H 1/00592* (2013.01); *B60N 3/002* (2013.01)

(58) Field of Classification Search
CPC .......... B60N 3/104; B60N 3/002; B60R 7/02; B60R 5/02; B60H 1/00007; B60H 1/00271; B60H 1/00592
USPC ...................................................... 296/37.12
See application file for complete search history.

(56) References Cited

U.S. PATENT DOCUMENTS

| 1,179,445 | A | * | 4/1916 | Manning ................. B60R 7/043 224/275 |
| 3,850,006 | A | | 11/1974 | Redfern et al. |
| 4,637,222 | A | | 1/1987 | Fujiwara et al. |
| 5,299,704 | A | * | 4/1994 | Thorby .................... B65D 7/26 224/404 |
| 10,029,618 | B2 | * | 7/2018 | Perez Astudillo ...... B60R 5/048 |
| 10,953,721 | B2 | | 3/2021 | Gruber |
| 11,148,602 | B2 | | 10/2021 | Ahlning |

(Continued)

FOREIGN PATENT DOCUMENTS

CN     102320257 A    1/2012
DE    102012204160 A1   9/2013
(Continued)

OTHER PUBLICATIONS

Tesla Model S Front Trunk (Frunk) Electric Cooler Review, 9 pages, posted on Jan. 31, 2014, www.teslarati.com/tesla-model-s-front-trunk-frunk-cooler/.

*Primary Examiner* — Hilary L Gutman
(74) *Attorney, Agent, or Firm* — Vichit Chea; Price Heneveld LLP

(57) ABSTRACT

A thermal enclosure assembly for a vehicle includes a container disposed in a compartment of the vehicle that selectively couples with a wall of the compartment. The container is movable between a retracted position and an extended position. A tray couples with the wall and pivots between a folded position and an unfolded position to selectively enclose the container with the wall. The container is configured to move between the retracted position and the extended position when the tray is in the unfolded position.

18 Claims, 5 Drawing Sheets

(56) References Cited

U.S. PATENT DOCUMENTS

| | | | | |
|---|---|---|---|---|
| 2001/0020631 A1* | 9/2001 | Spykerman | ............... | B60R 7/02 |
| | | | | 224/539 |
| 2005/0242138 A1* | 11/2005 | Warganich | ............... | B60R 7/02 |
| | | | | 224/404 |
| 2006/0266778 A1* | 11/2006 | Allotey | .................... | B60R 9/00 |
| | | | | 224/403 |
| 2009/0026197 A1* | 1/2009 | Chou | ................... | A45C 7/0036 |
| | | | | 220/9.2 |
| 2010/0051616 A1* | 3/2010 | Shea | ................ | B65D 81/3823 |
| | | | | 220/4.28 |
| 2010/0052353 A1* | 3/2010 | Shea | ....................... | B60R 11/06 |
| | | | | 296/37.16 |
| 2010/0264180 A1* | 10/2010 | Allotey | .................. | B60R 11/06 |
| | | | | 224/404 |
| 2018/0037150 A1 | 2/2018 | Rotharmel | | |
| 2020/0023784 A1* | 1/2020 | Flajnik | .................... | B60R 9/065 |

FOREIGN PATENT DOCUMENTS

| | | | |
|---|---|---|---|
| DE | 102016203084 A1 | 9/2017 | |
| DE | 102020135071 A1 | 7/2021 | |
| EP | 1205355 A2 * | 5/2002 | ............... B60R 7/02 |
| WO | 2021245557 A1 | 12/2021 | |

* cited by examiner

THERMAL ENCLOSURE ASSEMBLY FOR A VEHICLE

FIELD OF THE DISCLOSURE

The present disclosure generally relates to a thermal enclosure assembly for a vehicle and, more particularly, relates to an expandable cooler that selectively couples with a compartment of the vehicle.

BACKGROUND OF THE DISCLOSURE

Compartments for vehicles can be climate controlled. For example, some compartments may be configured for heating or cooling items in the compartment. Alternatively, a climate controlled case may be disposed in a dedicated location in the vehicle. However, conventional climate controlled cases typically do not couple with onboard heating or cooling devices associated with the vehicle. Further, typical climate-controlled cases are not selectively expandable or concealable in a region of the vehicle. A need is presented for a dynamic arrangement that allows for both space optimization and effective portability.

SUMMARY OF THE DISCLOSURE

According to one aspect of the present disclosure, a thermal enclosure assembly for a vehicle comprises a container disposed in a compartment of the vehicle that selectively couples with a wall of the compartment. The container is movable between a retracted position and an extended position. A tray couples with the wall and pivots between a folded position and an unfolded position to selectively enclose the container with the wall. The container is configured to move between the retracted position and the extended position when the tray is in the unfolded position.

Embodiments of the first aspect of the disclosure can include any one or a combination of the following features:
- the tray is configured to limit a movement of the container between the retracted position and extended position in the folded position;
- comprises a fluid connection that extends between the container and the wall to allow an interior of the container to be thermally controlled via a climate control system of the vehicle;
- the interior expands between movement from the retracted position toward the extended position;
- the container includes a panel and a casing extending from the panel, the casing includes at least one fold to allow the casing to move with the panel between the retracted position and the extended position;
- the casing includes a deformable material and the panel includes a rigid material;
- the tray includes a sidewall that extends upwardly from a lower wall of the tray to define a receiving region that houses the container in the extended position;
- comprises a retention mechanism that extends between the container and the tray adjacent the sidewall to selectively secure the container with the tray in the extended position;
- the retention mechanism includes a handle that extends from the container and a retainer disposed adjacent an upper edge of the sidewall for receiving the handle;
- comprises a clasping member that is disposed on the container and is configured to selectively open or close a cover of the container;
- the cover and the clasping member each extend between a top of the container and a front panel of the container;
- the tray engages a floor of the compartment in the unfolded position;
- the tray includes a sidewall that conceals the container in the folded position when the container is in the retracted position;
- comprises at least one holder device that extends from the container to remove the container from the compartment; and
- removal of the container from the compartment breaks the fluid connection.

According to another aspect of the present disclosure, a thermal enclosure assembly for a vehicle comprises a container disposed in a compartment of the vehicle that selectively couples with a wall of the compartment. The container is movable between a retracted position and an extended position. The container includes a first rigid panel and a second rigid panel spaced from the first rigid panel. A casing extends between the panels to define an interior of the container. A tray pivots between a folded position and an unfolded position to selectively enclose the container with the wall. The container is configured to move between the retracted position and the extended position when the tray is in the unfolded position. A fluid connection is between the wall and the container to allow a climate control system of the vehicle to thermally control the interior.

Embodiments of the second aspect of the disclosure can include any one or a combination of the following features:
- the first rigid panel that couples with the wall during a movement of the second rigid panel between the retracted and extended positions;
- the tray is configured to limit a movement of the container between the retracted position and the extended position in the folded position; and
- the tray and the container each define a notch extending along a bottom portion of the thermal enclosure assembly for receiving a pair of straps for lifting the tray and the container from the compartment.

According to another aspect of the present disclosure, a cooler for a vehicle comprises a container disposed in a compartment of the vehicle that selectively couples with a wall of the compartment. The container is movable between a retracted position and an extended position. A tray pivots between a folded position and an unfolded position to selectively enclose the container with the wall. The container is configured to move between the retracted position and the extended position when the tray is in the unfolded position. A fluid connection extends between an interior of the container and the wall. A climate control system is in fluid communication with the container via the fluid connection and is configured to cool the interior in the retracted and extended positions.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
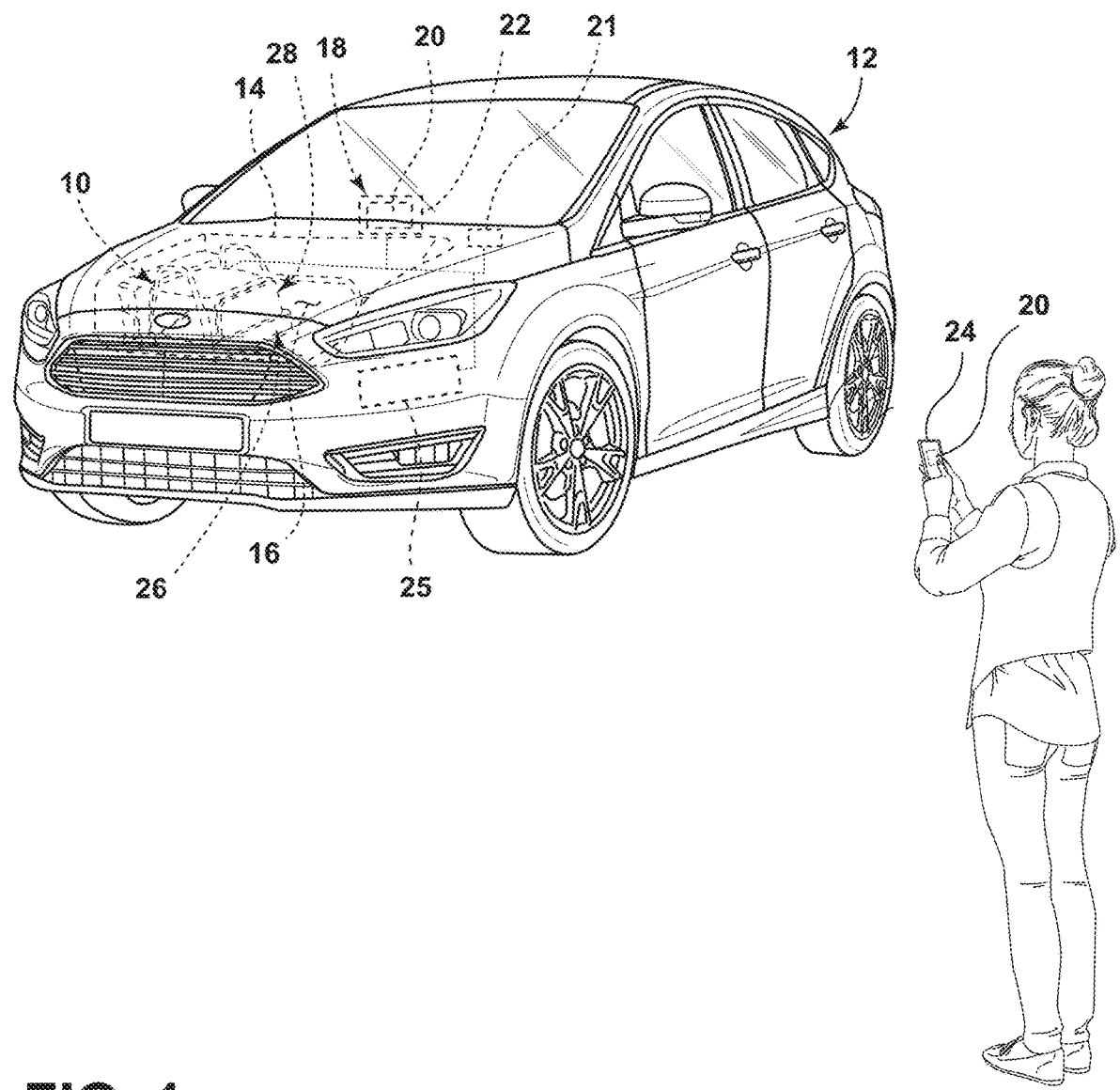
FIG. 1 is a perspective view of a vehicle incorporating a thermal enclosure assembly of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a thermal enclosure assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate-controlled thermal structure selectively disposed in an interior space of a vehicle. The interior space may be a preformed cavity within the vehicle that is capable of housing the thermal structure, such as a cooler, and securing the thermal structure to a structure that defines the interior space (e.g., an outer wall of the cavity). The thermal structure may be permanently or temporarily secured with the outer wall or otherwise within the interior space, such that the thermal structure may be removable from the interior space or configured to be kept in the interior space. In examples in which the thermal structure may be removed from the interior space (e.g., a portable cooler), an environment of the interior space may be climate-controlled. In this way, environmental conditions of the interior space as a whole and/or environmental conditions of an expandable or removable thermal structure may be controlled.

Referring generally to the figures, the present disclosure provides for a thermal enclosure assembly 10 for use in a vehicle 12. Although generally illustrated in the figures as being incorporated with a front trunk of the vehicle 12, also commonly referred to as a frunk of an electric vehicle, it is contemplated that the thermal enclosure assembly 10 of the present disclosure may be incorporated with any compartment 14 of the vehicle 12 and is not limited to the front trunk of the vehicle 12. For example, the compartment 14 may be a passenger compartment, trunk compartment, or any other area or exterior cavity disposed in the vehicle 12. In general, the compartment 14 may form a thermally insulated space 16, which may be climate controlled via a climate control system 18 having at least one interface 20 for controlling environmental attributes of the space 16. For example, the climate control system 18 may be configured to control a temperature, a humidity, an airspeed, or the like in or through the space 16 via a controller 21 of or in communication with the climate control system 18. For example, the controller 21 may be configured to adjust fluid communication between the climate control system 18 and the thermal container. The at least one user interface 20 may be incorporated into a human-machine interface (HMI) 22 associated with a cabin of the vehicle 12 and/or may be incorporated into a mobile device 24, such as a phone, tablet, laptop, etc., for controlling the space 16 outside of the vehicle 12.

Although not shown in detail, the climate control system 18 may incorporate various heat control devices, such as a heat exchanger, that are configured to interface with the thermal enclosure assembly 10 of the present disclosure. In some examples, the climate control system 18 includes a heat control source 25 disposed in the vehicle 12 that is configured to control hot or cold air to be delivered to the compartment 14 or the thermal structure. For example, the climate control system 18 may include multiple heat exchangers and/or multiple sub climate control systems that allow isolated or combined control for one or more compartments of the vehicle 12. In general, the climate control system 18 may be configured to provide cool or warm air toward the compartment 14. For example, the climate control system 18 may supply cool air and return warm air in order to reduce the temperature of the compartment 14 or devices in the compartment 14. As will be further described herein, a cooler or other structure may cover inlets and/or outlets of the climate control system 18 in the compartment 14 in order to heat or cool the cooler or other thermal structure.

In some examples, the climate control system 18 includes a dedicated heat pump system or another subsystem such as a heating, ventilation, and air conditioning (HVAC) system of the vehicle. In one example, the climate control system 18 is a dedicated dual-box heat pump system (e.g., a compact vehicle thermal management system (CVTMS)). Other exemplary thermal management systems may be employed to provide cool air to a cooler, a thermal box, or another structure in order to allow the thermal structure to utilize the climate control system 18 of the vehicle 12 to manage/control thermal properties inside of the cooler.

Figure 2:
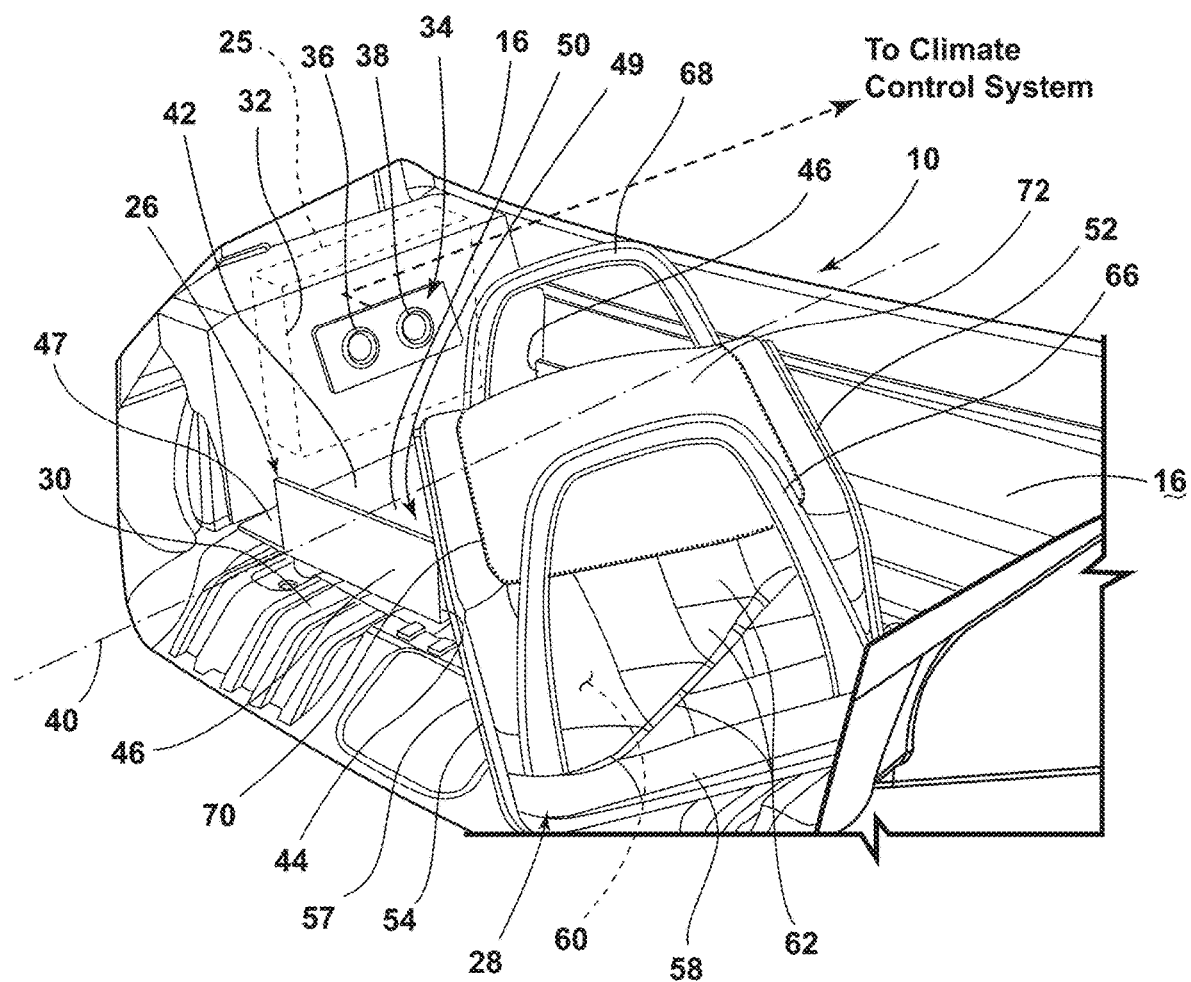
FIG. 2 is a perspective view of a container of a thermal enclosure assembly removed from a compartment of a vehicle according to one aspect of the present disclosure.

Referring now to FIG. 2, the heat control source 25 may be disposed adjacent to the space 16, though other locations in the vehicle 12 are possible (see FIG. 1). The thermal enclosure assembly 10 may include a tray 26 and a container 28 that is selectively removable from the tray 26. As will be described herein, the container 28 of the present disclosure may be expandable and/or retractable/compressible in one or more directions (e.g., from front to back, from side to side, etc.) and selectively couple with a wall 30, 32 of the compartment 14. The wall 30, 32, or walls, may refer to a floor 30 and/or an upright wall 32 extending from the floor 30 to define the compartment 14. The upright wall 32 may be referred to as a side wall of the compartment 14 and include a back wall, a front wall, and a pair of lateral walls. Accordingly, the container 28 may couple with a structural frame portion of the compartment 14 that defines the compartment 14.

Still referring to FIG. 2, a coupling 34 may be disposed on the wall 30, 32 and house at least one conduit 36, 38, such as an inlet port 36 and an outlet port 38, that is in communication with the climate control system 18. For example, cool air may be pumped into the compartment 14 or the container 28 and hot air may be drawn from the compartment 14 or the container 28 to reduce the temperature and/or draw heat from the container 28 or the compartment 14. In some examples, the coupling 34 is configured to only deliver cool air to the container 28 and be shut off or otherwise disconnected from the compartment 14 if the container 28 is removed from attachment with the coupling 34. These examples are not limiting, as it is contemplated that the coupling 34 may be configured to communicate climate-controlled air to/from the compartment 14 in some examples.

Figure 3A:
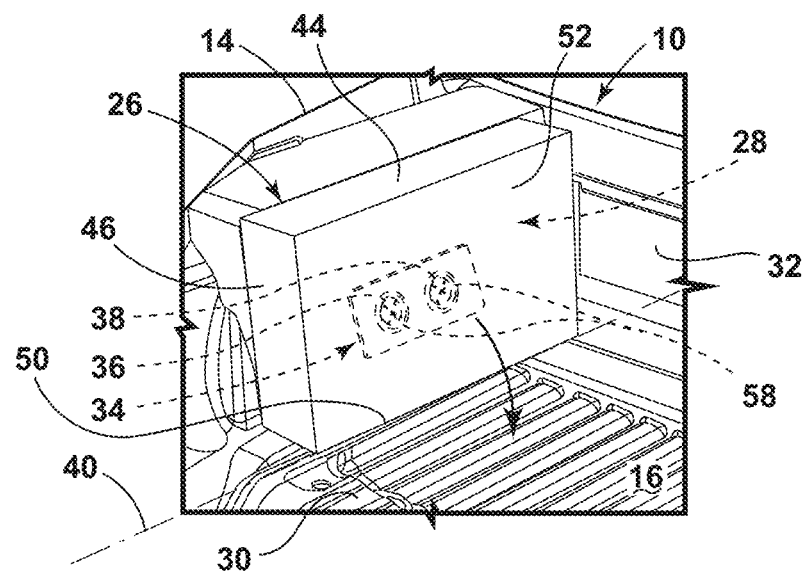
FIG. 3A is a perspective view of an exemplary thermal enclosure assembly in a compact position according to one aspect of the present disclosure.
Figure 3B:
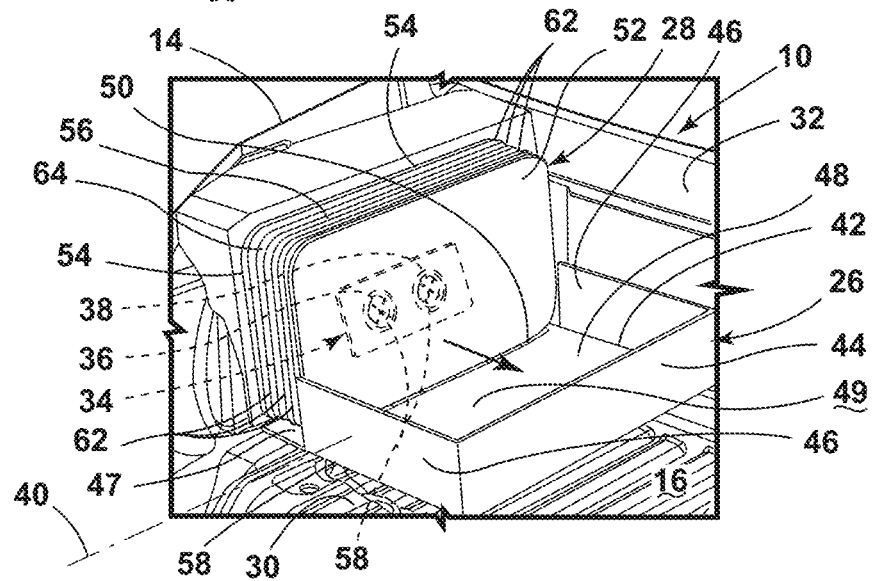
FIG. 3B is a perspective view of the thermal enclosure assembly of FIG. 3A in a fold-out position.
Figure 3C:
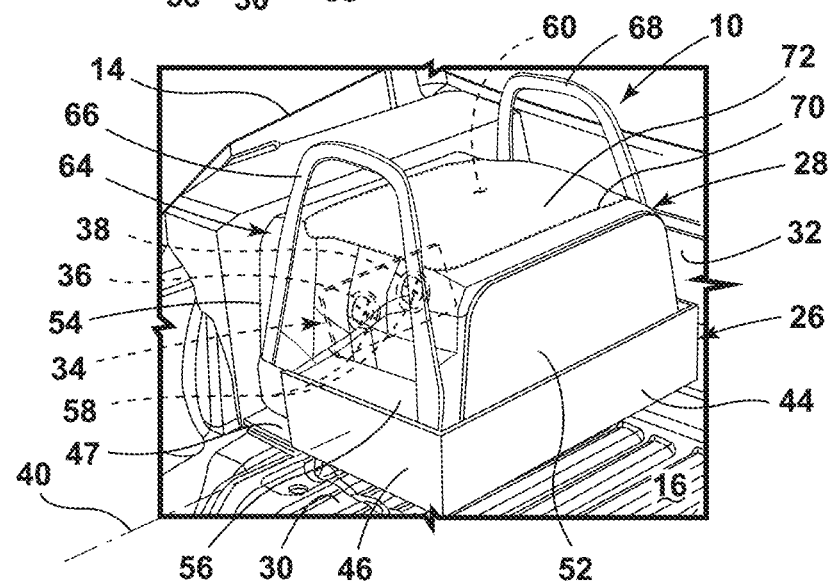
FIG. 3C is a perspective view of the thermal enclosure assembly of FIGS. 3A and 3B in a fully expanded position.

Referring now more generally to FIGS. 2-3C, the tray 26 may be mounted to the wall 30, 32, such as the floor 30, and be configured to pivot between a folded position (e.g., FIG. 3A) and an unfolded position (e.g., FIGS. 2, 3B, and 3C). For example, the tray 26 may be configured to rotate about a first axis of rotation 40 generally extending along the floor 30. The tray 26 may include a lower wall 42 disposed proximate to the floor 30 and a sidewall 44, 46 that extends outwardly from the lower wall 42 to define a receiving region 49 that allows for expansion of the container 28 from a retracted position of the container 28 (e.g., FIGS. 3A and 3B) to an extended position of the container 28 (e.g., FIG. 3C). The sidewall 44, 46 may include an end wall 44 and side portions 46. The pair of side portions 46 may extend generally parallel to one another and from the end wall 44 to guide the container 28 between the retracted and extended positions. The lower wall 42 may have a secured portion 47 and a pivotable portion 48 disposed on either side of the first axis of rotation 40, with the secured portion 47 disposed adjacent the container 28 when the container 28 is in a retracted position and with the pivotable portion 48 being rotatable relative to the floor 30. In general, when the container 28 is in the retracted position, the container 28 may be disposed behind the axis of rotation 40. For example, when the tray 26 is in the folded position, the pivotable portion 48 of the lower wall 42 may be approximately or substantially perpendicular to the floor 30 and serve to cover the container 28. Further, the sidewall 44, 46 of the tray 26 may cover peripheral portions of the container 28 from view, as illustrated in FIG. 3A, when the tray 26 is in the folded position.

Still referring to FIGS. 2-3C, the tray 26 may include a hinge 50 that extends along the first axis of rotation 40. The hinge 50 may include male and female fasteners commonly included in hinge connections. The hinge 50 may be unbiased or may be biased toward the folded or unfolded positions. In one example, the tray 26 is biased towards the folded position in order to supply enough force to keep the container 28 in the retracted position and/or limit the cooler from moving toward the extended position. It is also contemplated that the hinge connection may include multiple points along a range of motion between the folded position and the unfolded position in which different biases apply (e.g., biased toward the folded position within a first portion of the motion and biased toward the unfolded position in a second portion of the motion).

The container 28 may include at least one panel 52, 54 and a casing 56 extending from the at least one panel 52, 54 toward the wall 30, 32. In the example illustrated, the at least one panel 52, 54 includes a front panel 52 and a rear panel 54, with the front panel 52 being movable with the casing 56 between the retracted position and the extended position. In the example illustrated, the rear panel 54 includes a mating surface 57 (FIG. 2) on the rear panel 54 which may remain coupled with the wall 30, 32 during movements between the extended position and the retracted positions. The mating surface 57 may include an interlocking feature or other mating connection that allows the rear panel 54 to selectively couple with the coupling mechanism 34 previously described mounted to the wall 30, 32. The mating connection may allow the container 28 to stretch or expand from the wall when the container 28 is coupled with the wall 30, 32 and may be adjustable to allow the container 28 to be removed from the wall 30, 32. Exemplary mating connections include, but are not limited to, fasteners, clips, and the like. When the container 28 is coupled with the wall 30, 32, a fluid connection 58 allows fluid communication between the climate control system 18 and an interior 60 of the container 28 to allow the interior 60 to be climate controlled.

As illustrated in FIGS. 2, 3B, and 3C, the casing 56 may include one or more folds 62 disposed about a periphery 64 of the casing 56 to allow the casing 56 to expand and retract, thereby allowing the interior 60 to increase or decrease. For example, the interior 60 may increase in volume between the retracted position and the extended position. The folds 62 may form a zigzag or winding pattern between the front and rear panels 52, 54. In some examples, the folds 62 may be internal to the material employed in the casing 56. For example, the casing 56 may employ an elastomeric material that allows stretching of the material within the folds 62. In such an example, it is contemplated that the front panel 52 may latch onto the tray 26 in the extended position to maintain the container 28 in the extended position to limit the container 28 from returning to the retracted positions as will further be described. In some examples, at the at least one panel 52, 54 is a rigid or semi-rigid member or incorporates a rigid or semi-rigid material. The at least one panel 52, 54 may have a higher elastic modulus than the casing 56 and/or the folds 62 and may generally be less flexible than the casing 56. Examples of materials employed for the casing 56 and/or the folds 62 may include fabrics, polyester, cotton, and the like. The material employed for one or both of the front or rear panels 52, 54 may include rigid materials that may incorporate polyester and the like, but may further include plastics or other hard materials that may provide rigidity to the panels 52, 54.

Referring more particularly to FIGS. 2 and 3C, the container 28 may include first and second straps 66, 68, or looped grips, that allow a user to lift or manipulate the cooler to cause the cooler to be removed from the compartment 14. The straps 66, 68 may extend upwardly from the casing 56 and be made of a similar material as the casing 56. A clasping member 70 may also be provided on the container 28 to allow selective opening or closing of a cover 72 of the container 28. In the example illustrated, the clasping member 70 extends in a transverse direction adjacent to the front and rear panels 52, 54, and between the front and rear panels 52, 54 along an edge corresponding to the location of the folds 62. The clasping member 70 may be a zipper that extends between the cover 72 and the casing 56 to allow selective covering of the interior 60 of the casing 56. As will be illustrated in further examples, the clasping member 70 may extend beyond a top of the container 28, such that the cover 72 extends along frontal areas of the container 28 (e.g., the front panel 52). It is contemplated that, although illustrated as being removable from the tray 26, the container 28 in the example illustrated in FIGS. 2-3C may allow the tray 26 to be removable with the container 28 from the compartment 14, as will be illustrated and described with respect to the proceeding figures.

Figure 4A:
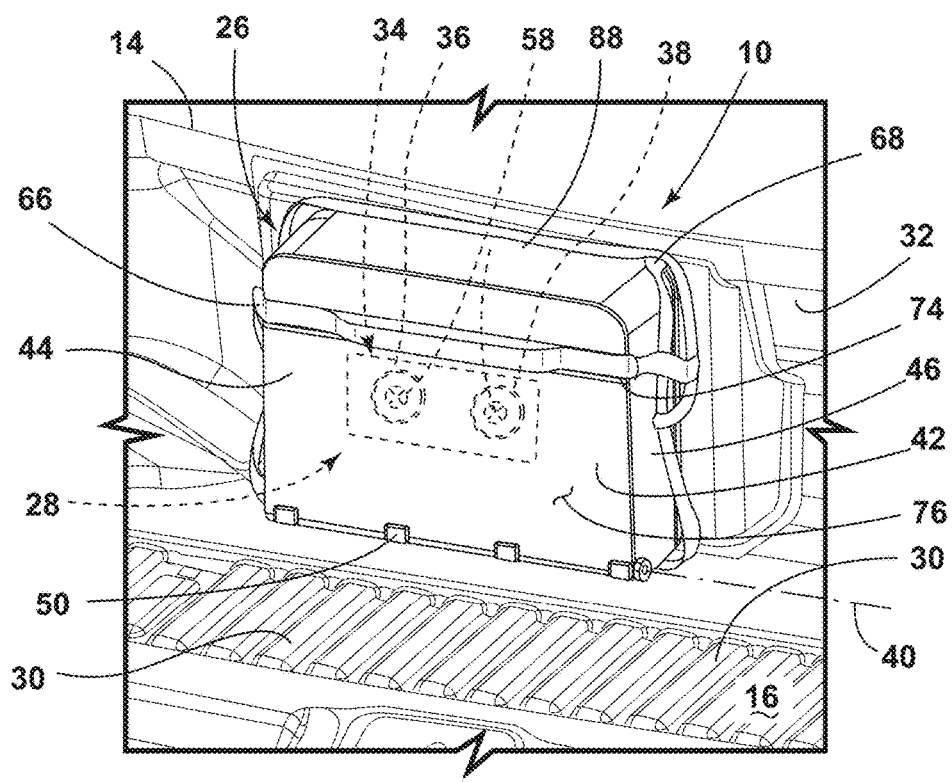
FIG. 4A is a perspective view of an exemplary thermal enclosure assembly in a compact position according to one aspect of the present disclosure.
Figure 4B:
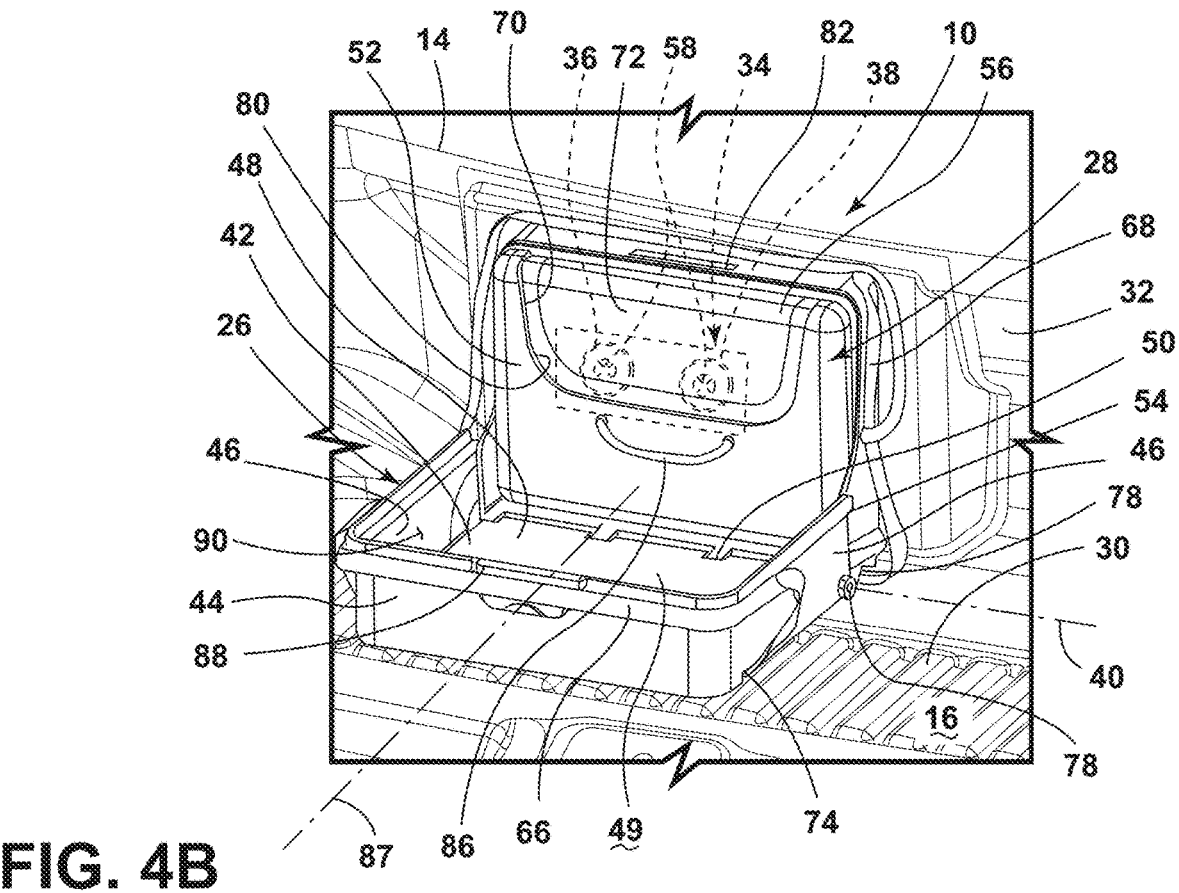
FIG. 4B is a perspective view of the thermal enclosure assembly of FIG. 4A in a fold-out position.
Figure 4C:
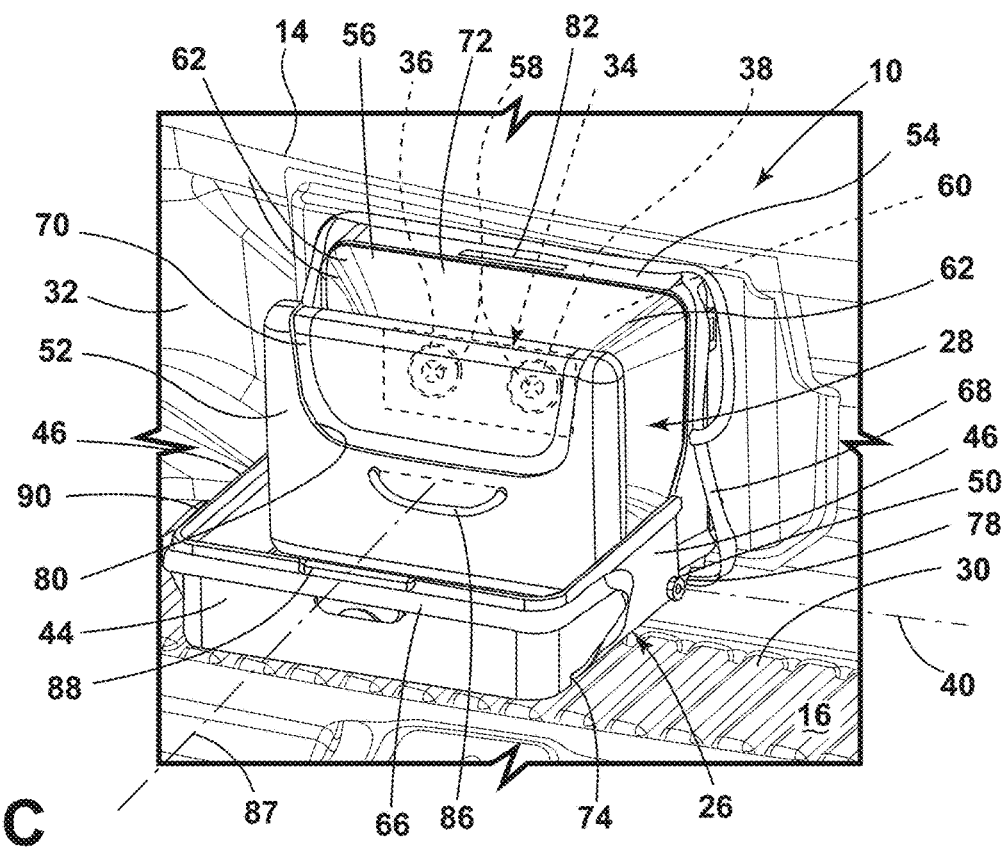
FIG. 4C is a perspective view of the thermal enclosure assembly of FIGS. 4A and 4B with a container of the thermal enclosure assembly in an intermediate position between a retracted position of the container and an extended position of the container.
Figure 4D:
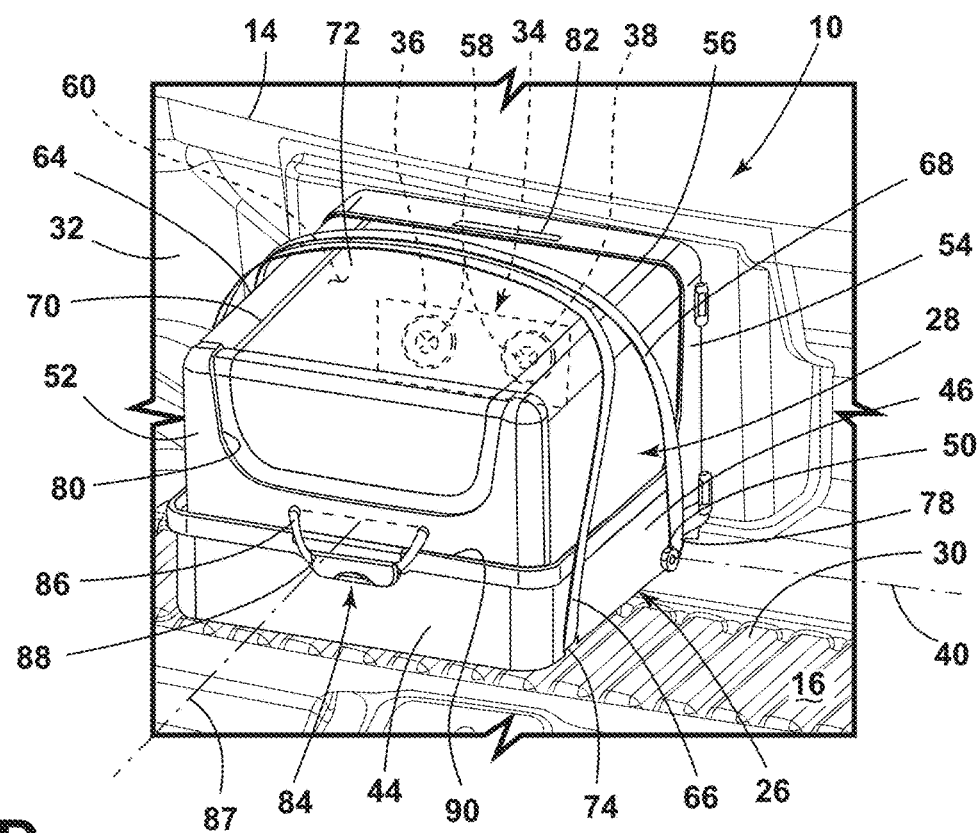
FIG. 4D is a perspective view of the thermal enclosure assembly of FIG. 4C with the container in the extended position.

Referring now to FIGS. 4A-4D, another example of the thermal enclosure assembly 10 may be coupled to the back wall, as opposed to one of the lateral walls as demonstrated in FIGS. 2-3C. In addition to including the various features previously described with respect to FIGS. 2-3C, the tray 26 may define a first notch 74 extending into the lower wall 42 from an underside surface 76 of the lower wall 42. As illustrated in FIGS. 4B-4D, the rear panel 54 may be configured with a different geometry than the front panel 52 and include a depth for receiving the front panel 52 and the casing 56 in the retracted position. The rear panel 54 may define a second notch 78 that extends underneath the rear panel 54 and is generally parallel with the first notch 74. The first and second notches 74, 78 are configured to receive the first and second straps 66, 68, respectively, that may serve as grips 66, 68 for the user to remove the thermal enclosure assembly 10 from the compartment 14. For example, when the tray 26 is on in the unfolded position and the container 28 is in the extended position, the straps 66, 68 may pass through the first and second notches 74, 78 and abut the container 28 to allow the user to grasp the straps/grips 66, 68 to lift the container 28 and the tray 26 from the compartment 14. As previously described, various interlocking fasteners may secure the tray 26 with the wall 30, 32 selectively, such that user manipulation mechanically or electronically (via, e.g., the user interface 20) may allow for release of the thermal enclosure assembly 10 from the compartment 14.

Still referring to FIGS. 4B-4D, the front panel 52 may define an indentation 80 to allow the clasping member 70 to extend along the front panel 52. As previously described, the panel 52, 54 may be a rigid material and the casing 56 may be of a flexible canvas or polyester material. In some examples, the casing 56 includes a deformable material, such as fabric, foam, a polymeric material, or another deformable material. The boundary between the panel 52, 54 and the canvassing material at the clasping member 70 may extend downwardly from a top of the container 28 to allow access to the user from the front of the compartment 14. For example, the clasping member 70 may be a zipper that when unzipped reveals the interior 60 of the container 28 from a front perspective and from a top perspective. Further, it is contemplated that the rear panel 54 may include a ledge 82, or locking part, that is configured to receive an interior surface of the sidewall 44, 46 to hold the tray 26 in the folded position. Upon pressure or manipulation of the tray 26, the tray 26 may be unfolded and may be moved to the unfolded position as previously described.

With continued reference to FIGS. 4B-4D, a retention mechanism 84 may be disposed between the container 28 and the tray 26 to hold the container 28 in the extended position. A handle 86 may be pivotable along a second axis of rotation 87 between an outboard position (FIGS. 4B and 4C) and a locking position (FIG. 4D). The retention mechanism 84 may include a retainer 88 that extends from a top edge 90, or upper edge, of the sidewall 44, 46 of the tray 26. Although illustrated as extending from the end wall 44 of the sidewall 44, 46, it is contemplated that the retainer 88 may extend from any portion of the sidewall 44, 46 to receive the handle 86 in the extended position.

In operation, the user may unfold the tray 26 (FIG. 4B), grasp the handle 86 in the outboard position, pull the container 28 to the extended position (which may be achieved via stretching of the folds 62 of the casing 56), manipulate the handle 86 downwardly to the locking position to engage the retainer 88, and unzip, or decouple, the clasping member 70 to open the cover 72 and fill the interior 60 of the container 28 with contents, such as food, refrigeratables, and the like. When removing the thermal enclosure assembly 10 from the compartment 14, the user may unlock or release the tray 26 from connection with the coupling mechanism 34 and/or the fluid connection 58 via electronic or mechanical interlocks, then lift the container 28 and/or the tray 26 from the compartment 14 via the straps 66, 68.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A thermal enclosure assembly, comprising:
a container configured to be disposed in a compartment of a vehicle and wherein the container is configured to be selectively coupled with a wall of the compartment, the container being movable between a retracted position and an extended position;
a tray configured to be coupled with the wall and pivotable between a folded position and an unfolded position to selectively enclose the container with the wall, wherein the container is configured to move between the retracted position and the extended position when the tray is in the unfolded position, wherein the tray includes a sidewall extending upwardly from a lower wall of the tray to define a receiving region that houses the container in the extended position, wherein the lower wall comprises
a secured portion, and
a pivotable portion, wherein the secured portion is disposed adjacent the container when the container is in a retracted position and the pivotable portion is configured to be rotatable relative to the floor of the vehicle; and
a retention mechanism extending between the container and the tray adjacent the sidewall to selectively secure the container with the tray in the extended position.

2. The thermal enclosure assembly of claim 1, wherein the tray is configured to limit a movement of the container between the retracted position and extended position in the folded position.

3. The thermal enclosure assembly of claim 1, further comprising:
a fluid connection extending between the container and the wall to allow an interior of the container to be thermally controlled via a climate control system of a vehicle.

4. The thermal enclosure assembly of claim 3, wherein the interior expands between movement from the retracted position toward the extended position.

5. The thermal enclosure assembly of claim 1, wherein the container includes a panel and a casing extending from the panel, the casing including at least one fold to allow the casing to move with the panel between the retracted position and the extended position.

6. The thermal enclosure assembly of claim 5, wherein the casing includes a deformable material and the panel includes a rigid material.

7. The thermal enclosure assembly of claim 1, wherein the retention mechanism includes a handle extending from the container and a retainer disposed adjacent an upper edge of the sidewall for receiving the handle.

8. The thermal enclosure assembly of claim 1, further comprising:
a clasping member disposed on the container configured to selectively open or close a cover of the container.

9. The thermal enclosure assembly of claim 8, wherein the cover and the clasping member each extend between a top of the container and a front panel of the container.

10. The thermal enclosure assembly of claim 1, wherein the tray engages a floor of the compartment in the unfolded position.

11. The thermal enclosure assembly of claim 10, wherein the tray includes a sidewall that conceals the container in the folded position when the container is in the retracted position.

12. The thermal enclosure assembly of claim 3, further comprising:
at least one holder device extending from the container to remove the container from the compartment.

13. The thermal enclosure assembly of claim 12, wherein removal of the container from the compartment breaks the fluid connection.

14. A vehicle, comprising:
a container disposed in a compartment of the vehicle and selectively coupling with a wall of the compartment, the container movable between a retracted position and an extended position, wherein the container includes:
a front rigid panel and a rear rigid panel spaced from the front rigid panel;
a casing extending between the panels to define an interior of the container,
wherein the rear rigid panel, comprising:
a mating surface selectively coupled with a coupling mechanism of the vehicle to establish the fluid connection between the container and the wall; and
a ledge;
a tray pivotable between a folded position and an unfolded position to selectively enclose the container with the wall, wherein the container is configured to move between the retracted position and the extended position when the tray is in the unfolded position, wherein the tray comprises:
a sidewall, wherein an interior surface of the sidewall can be received by the ledge of the container, such that the ledge can hold the tray in the folded position; and
a lower wall, wherein the sidewall extends upwardly from the lower wall of the tray to define a receiving region that houses the container in the extended position; and
a retention mechanism extending between the container and the tray adjacent the sidewall to selectively secure the container with the tray in the extended position, and wherein the fluid connection between the wall and the container allows a climate control system of the vehicle to thermally control the interior of the container.

15. The vehicle of claim 14, wherein the first rigid panel is coupled with the wall during a movement of the second rigid panel between the retracted and extended positions.

16. The vehicle of claim 14, wherein the tray is configured to limit a movement of the container between the retracted position and the extended position in the folded position.

17. The vehicle of claim 16, wherein the tray and the container each define a notch extending along a bottom portion of the vehicle for receiving a pair of straps.

18. A vehicle, comprising:
a container disposed in a compartment of the vehicle and selectively coupling with a wall of the compartment, the container movable between a retracted position and an extended position;
a tray pivotable between a folded position and an unfolded position to selectively enclose the container with the wall, wherein the container is configured to move between the retracted position and the extended position when the tray is in the unfolded position;
a fluid connection extending between an interior of the container and the wall;
a climate control system in fluid communication with the container via the fluid connection and configured to cool the interior in the retracted and extended positions, wherein the tray includes a sidewall extending upwardly from a lower wall of the tray to define a receiving region that houses the container in the extended position;
a retention mechanism extending between the container and the tray adjacent the sidewall to selectively secure the container with the tray in the extended position; and
a clasping member disposed on the container and configured to selectively open or close a cover of the container, wherein a front panel of the container defines an indentation that allows the clasping member to extend along the front panel.

\* \* \* \* \*